Nov. 16, 1965  A. K. CHITAYAT  3,217,588
FIBER OPTICAL IMAGE ENHANCEMENT DEVICE UTILIZING
POLARIZED SYNCHRONOUS MOTORS
Filed Oct. 27, 1961  2 Sheets-Sheet 1

INVENTOR.
ANWAR K. CHITAYAT
BY James P. Malone

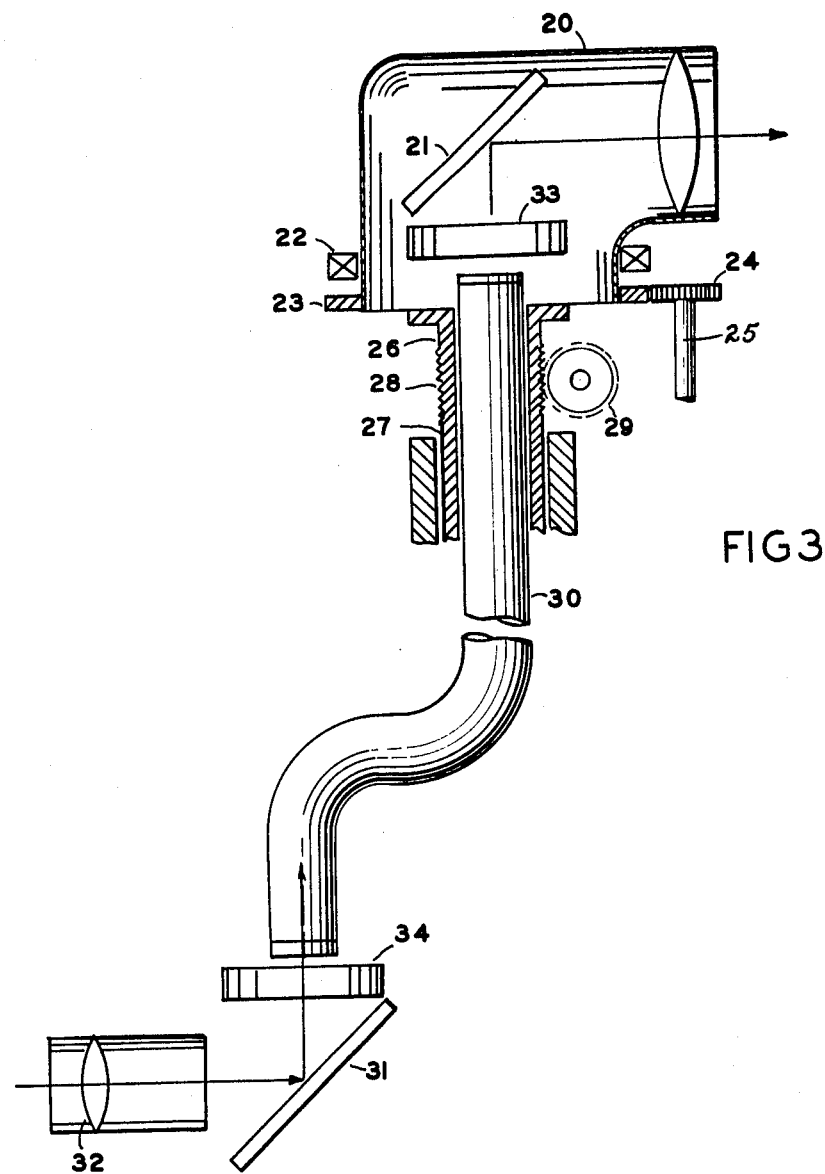

United States Patent Office 3,217,588
Patented Nov. 16, 1965

3,217,588
FIBER OPTICAL IMAGE ENHANCEMENT DEVICE UTILIZING POLARIZED SYNCHRONOUS MOTORS
Anwar K. Chitayat, 8 Gilbert Lane, Plainview, N.Y.
Filed Oct. 27, 1961, Ser. No. 148,258
2 Claims. (Cl. 88—1)

This application is a continuation-in-part of my prior copending application Serial No. 116,179, filed June 9, 1961, now abandoned.

This invention relates to fiber optic image transmitting means and more particularly to means for minimizing image deterioration due to fiber structure and broken fibers in the cable.

More particularly the invention relates to synchronous motor means for nutating an image at the beginning of a fiber optic cable and phase locked synchronous motor means for nutating the image at the output of the cable. The net result is that the image being transmitted through the cable remains stationary. However, the image of the cable itself, i.e., broken fibers and spaces between fibers, is nutated so that it is no longer recognizable.

The present state of the art of flexible fiber cables is such that a good quality image cannot be transmitted through a flexible fiber cable (fiberscope). The reason for this is actual manufacturing difficulties whereby spaces are observed between the fiber bundles in addition to quite a few broken fibers throughout the section of the cable. Consequently, it is proposed that the transmission qualities of the fiber cable be enhanced by means outside the cable.

The proposed technique is to integrate the image transmitted through the fiber cable over a large section of the fiber cable. In other words, if a person were to take the fiber cable and vibrate it around the axis at extremely high rates, then he would see an image which is far superior to that occurring when the cable is not vibrating. However, this vibration is not practical in almost all situations where a fiber cable is to be used. The difficulties in the proposed approach to the problem may be solved however by actually rotating optical elements at the two ends of the fiber cable. A first wedge is placed close to the entrance of the fiber cable. This wedge displaces the image by a fixed distance. Now, if one rotates the wedge about its center then the image nutates, i.e., describes a circle. Other means of tilting and rotating an image may be used such as inclined mirrors, prisms, lenses, and polysided variations thereof.

At the exit of the fiber cable a similar wedge configuration is repeated to displace the image back to the original optical axis. The two wedges are rotated in phase synchronism, for instance at 1200 r.p.m. Consequently, the image observed at the exit is not changed by the introduction of the entrance and exit wedges. Thus, if the entrance wedge is rotated in synchronism with the exit wedges, the image transmitted through the cable would look stationary. Broken optical fibers, observed at the exit, would show up as an image which is rotated in a circle due to the existence of exit wedges. The broken fiber would then show up as a rotated circle. If this rotated circle has a circumference 100 times as large as the fiber diameter, then the loss of illumination at any portion of the cable would be approximately 1%. In other words, there will be little or no effect on the optical quality of the image due to the existence of broken fibers.

The method of synchronization of the entrance and exit wedges can be done in one of the following manners:

(1) *Flexible shaft drive.*—Here one motor is used to drive both entrance and exit wedges which are connected together by a flexible shaft. This method was described in my aforementioned application.

(2) *Servo drive.*—Several servo drive systems can be used whereby a synchro or a potentiometer or any other angular measuring device can be attached to one of these wedges which is driven by a constant speed motor. The other set of wedges is servoed to the first through a repeater synchro and a servo motor. Consequently, as one set of wedges rotates, the other followes in the same manner.

(3) *Polarized synchronous motors.*—In this method two synchronous motors are used, one on each side, which are phase locked to the supply frequency. Now, due to the fact that both motors are synchronized to the same frequency, they will rotate in synchronism.

The second and third methods, disclosed herein, eliminate the connecting shaft of the first method.

Accordingly, a principal object of the invention is to provide new and improved image transmitting means.

Another object of the invention is to provide new and improved image transmitting means using fiber optic cables.

Another object of the invention is to provide new and improved image transmitting means using fiber optic cables, means to rotate the input image to the cable and means to rotate the output image from the cable so that any image deterioration due to broken fibers and fiber structure are integrated and minimized.

Another object of the invention is to provide new and improved image transmitting means comprising a fiber optic cable and means to integrate the transmitted light so that loss of quality due to broken fibers is minmized, comprising motor means to rotate the image in phase synchronism at the input and output of said cable.

Another object of the invention is to provide new and improved means to displace the image at the input of a fiber optic cable, means to nutate said displaced image relative said cable and means at the output of said cable to nutate said image to restore said image to its original condition, and servo motor means to rotate said input and output means in synchronism.

Another object of the invention is to provide new and improved periscope means.

Another object of the invention is to provide new and improved remote viewing means.

Another object of the invention is to provide new and improved remote viewing microscope means.

These and other objects of the invention will be apparent from the following specification and drawings, of which FIG. 1 is a side view of one embodiment of the invention, using phase locked motors.

FIG. 3 is a side view of another embodiment of the invention, used as a periscope.

Figure 1:
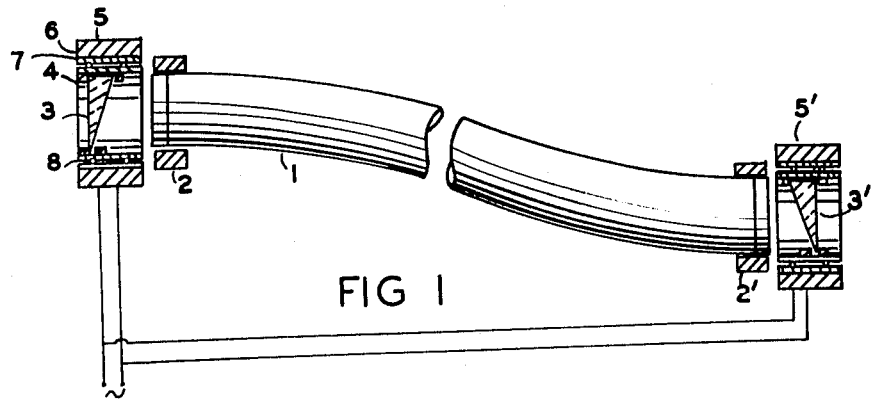

Referring to the figures the invention generally comprises a fiber optic cable 1 which may be conventional and which is mounted at each end by means of mounting collars 2 and 2'. The fiber optic cable may be of any desired length and may even be of the order of 100' long. At the input end of the cable is mounted an optical wedge 3 which is connected inside the hollow rotor 4 of a synchronous motor 5, the rotor 4 being mounted inside the stator 6 by means of bearings 7 and 8. The wedge is mounted in a large hollow shaftway of the rotor or armature 4 so that there is a clear optical path through the optical wedge 3. The motor 5 is of the synchronous type having the armature 4 polarized in relation to the stator so that after synchronization no 180° ambiguity can occur.

At the output end of the fiber optic cable is mounted an identical motor 5' which is adapted to rotate the wedge 3' in phase synchronism with the wedge 3 when the motors 5 and 5' are connected to a common supply source.

In operation, the input image is displaced slightly by the wedge 3 so that as the wedge is rotated each portion of the image describes a circle. Therefore, any particular spot on the image will not be transmitted by a single bundle of fibers but will be transmitted by a great many bundles of fibers. Therefore, distortion caused by the spaces between the fibers and broken fibers is minimized as the light rays from any particular spot on the image are integrated by being passed through a great many fibers.

Figure 2:
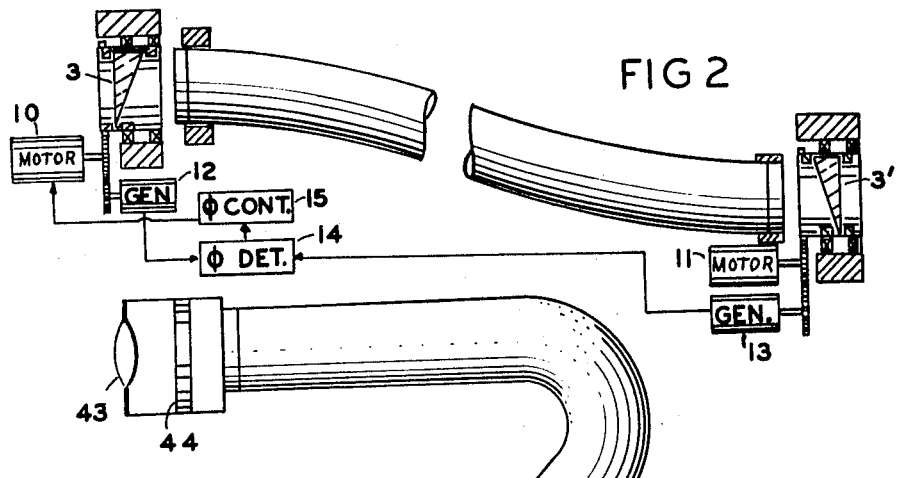
FIG. 2 is a side view of a second embodiment of the invention, using a servo motor drive.

FIG. 2 shows another modification of the invention utilizing a servo motor arrangement. In this arrangement two constant speed motors 10 and 11 drive the input and output wedges 3 and 3'. The phase of rotation at each end is transmitted by the repeater generator members 12 and 13 to a phase detector 14, the output of which is connected to a phase control means 15, which is connected to regulate the phase of the motor 11. When initially setting up the apparatus the rotation phase of the wedges may be adjusted by rotating the fiber optic cable within the collars 2 and 2'.

FIG. 3 shows an embodiment of the invention utilized in a periscope. The periscope comprises a viewing head 20 having a 45° mirror 21. The viewing head 20 is rotatably mounted by means of the bearings 22 and may be rotated by means of the ring gear 23 attached to the viewing head and the meshing gear 24 which is connected to a control shaft 25, which may be operated manually or by servo means. The bottom portion of the viewing head comprises a hollow shaft 26 which is mounted in a shaftway 27 so that the periscope may be raised and lowered, for instance by means of the rack 28 connected to the shaft 26 and the pinion gear 29 which may be remotely operated.

The image is transmitted from the 45° mirror 21 through a fiber optic cable 30 to the receiving apparatus which may comprise another 45° mirror 31 and an eye piece 32. At the ends of the fiber optic cable are mounted phase synchronized image enhancement means 33 and 34 which may be identical to those described in connection with FIGS. 1 and 2.

The present periscope provides a greatly simplified design and eliminates the use of dove prisms or other complicated devices. A fiber optic cable is quite flexible and may be bent 180° so that the periscope may be moved up and down as desired.

Figure 4:
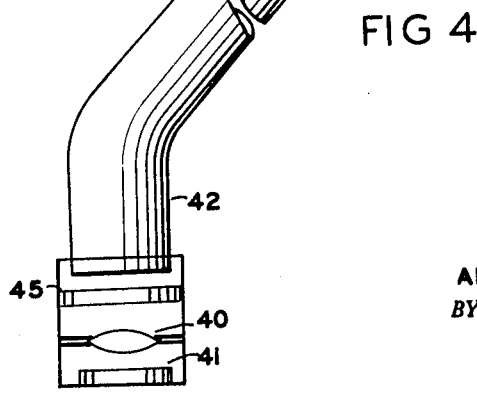
FIG. 4 is a side view of another embodiment of the invention, used as a remote viewing device.

FIG. 4 shows another embodiment of the invention utilized as a remote viewing device which may be a remote viewing microscope. This arrangement generally provides an objective lens 40 adapted to be placed closely to the viewed object 41. A fiber optic cable 42 transmits the image to a viewing lens or eye piece 43. This lens can be either an eyepiece for direct viewing by one operator or it may be a projection lens for display of the image of the cable onto a screen, for viewing by one or more persons. At each end of the fiber optic cable 42 is mounted image enhancing means 44 and 45 which may be rotating optical wedges or equivalent as described in connection with FIGS. 1 and 2. The remote viewing device of FIG. 4 may be used similarly to closed circuit television and may be used for operating an apparatus from a remote location such as in automatic power plants or radioactive location where the operator must be separated from the object or apparatus. The device is also useful where space limitations prevent the viewer from being directly near the object, for instance in viewing surgical operations.

Another use for the apparatus is in the viewing of large films where the operator can maintain his eye piece fixed while allowing the objective lens to accomplish any desired scanning. A system of this type is disclosed in applicant's copending application, S.N. 97,480 for Remote Viewing Means, filed March 22, 1961 and assigned to the assignee of the instant application, now Patent No. 3,143,589.

The same system described above can be used as a universal telescope; thus, instead of the objective lens being a microscope objective, it can be made as a long focal length telescope objective which images the targets at long range on the entrance plane of the fiber cable.

Many modifications may be made by those who desire to practice the invention without departing from the scope thereof which is defined by the following claims.

I claim:
1. A high resolution image transmission system for transmitting an image to a receiving site from a remote site of variable orientation relative to said receiving site comprising a coherent optic fiber cable having an input end for viewing said remote site and an output end for supplying an image at said receiving site, said cable being adapted to provide said ends with at least several degrees of relative freedom for adapting said cable to transmission between said variable oriented sites, and means for improving the quality of transmission through said cable independent of the relative orientation of said cable ends comprising input image displacing means for producing displacement of the image at said input end, output image displacing means for producing displacement of the image projected from said output end, and synchronizing and coordinating means for maintaining said image displacements in complementary relationship independent of the relative positioning of said ends comprising a common alternating current supply, polarized synchronous motor means each connected to said supply for phase locking said motor means with respect to the supply and otherwise operable independently of each other at each of said ends without the need for synchronizing interconnections between said ends for actuating the respective image displacing means to produce nutation of the respective image, said motor means each being oriented in relation to its respective image displacing means for maintaining said complementary relationship.

2. A system as defined in claim 1 including positioning means coupled to said input end for positioning said input end with at least several degrees of relative freedom.

References Cited by the Examiner

UNITED STATES PATENTS

| | | | |
|---|---|---|---|
| 1,724,650 | 8/1929 | Fox | 318—437 X |
| 2,166,947 | 7/1939 | Fayerweather | 318—437 X |
| 2,591,752 | 4/1952 | Wicklund. | |
| 2,691,112 | 10/1954 | Clifford et al. | 318—437 X |
| 2,843,005 | 7/1958 | Jones | 318—437 X |
| 3,016,785 | 1/1962 | Kapany | 88—1 |
| 3,110,762 | 11/1963 | Frank | 88—1 X |

DAVID H. RUBIN, *Primary Examiner.*

EMIL G ANDERSON, JEWELL H. PEDERSEN,
*Examiners.*